United States Patent
Schubert

[15] 3,698,524
[45] Oct. 17, 1972

[54] I.P.T.O BRAKE UNIT

[72] Inventor: William L. Schubert, Downers Grove, Ill.

[73] Assignee: International Harvester Company, Chicago, Ill.

[22] Filed: Feb. 19, 1971

[21] Appl. No.: 116,988

[52] U.S. Cl................192/18 A, 192/148, 74/15.63, 74/15.69
[51] Int. Cl. .......................F16d 67/04, F16d 71/00
[58] Field of Search.........192/18 R, 18 A, 18 B, 148, 192/149; 74/15.63, 15.69

[56] References Cited

UNITED STATES PATENTS

| 778,820 | 12/1904 | Brownell....................192/148 |
| 2,711,237 | 6/1955 | Wylie......................192/148 X |
| 2,472,452 | 6/1949 | Wissman..................192/18 A |

*Primary Examiner*—Allan D. Herrmann
*Attorney*—Floyd B. Harman

[57] ABSTRACT

A braking mechanism for an independent power take-off unit that prevents the independent power take-off shaft from rotating through an arc of more than 360° when the clutch is disengaged, but permits free rotation of the independent power take-off shaft through an arc of less than 360°.

5 Claims, 4 Drawing Figures

INVENTOR
WILLIAM L. SCHUBERT

I.P.T.O BRAKE UNIT

BACKGROUND OF THE INVENTION

This invention relates generally to a braking mechanism for limiting the arc through which a shaft may rotate to less than 360°. More specifically, as disclosed in the preferred embodiments, the braking mechanism prevents an independent power take-off (I.P.T.O.) shaft utilized on a farm tractor from rotating through an arc of more than 360° when the I.P.T.O. shaft has been disengaged from a rotatable power input shaft. However, the device will permit the I.P.T.O. shaft to free rotation through a limited arc sufficient to permit alignment of its splines with an associated farm implement.

It is quite well known in both the United States and foreign countries to utilize an I.P.T.O. shaft to deliver rotational power from a farm tractor to an associated implement. An example of such devices may be found in U.S. Pats. Nos. 3,001,409 issued to Von Fumetti and 3,002,393 issued to Browning, as well as U.S. Pat. No. 3,352,165 issued to Lee. Thus a countershaft driven by the engine is often connected with a hydraulically actuated clutch which upon engagement will drive an I.P.T.O. output shaft to which is connected an adapter means for coupling same to an implement. Means are normally provided whereby an operator of the tractor may, at his discretion, hydraulically engage or disengage the clutch to deliver power from an adapter shaft which is coupled with the implement. Such assemblies have not only been well accepted by farmers in both U.S. and in foreign countries, but such acceptance has been followed by national standards pertaining to the speed and dimensions of the adapter shaft. For example, within the United States, adapter shafts that alternatively transmit power from the I.P.T.O. shaft to the farm implement have been standarized at 6 and 21 external splines, adapted to rotate at speeds of 540 rpm and 1,000 rpm respectively so as to mate with internal splines of the coupling member extending from the implement to which the power is to be delivered.

Because the adapter shaft is generally exposed when disconnected from a farm implement, safety considerations suggest that rotation be prevented when so exposed. However, when utilizing hydraulically actuated clutches to drive the I.P.T.O. and adapter shaft, frictional drag between the clutch disks often transmits power to such shafts whereby rotation of the adapter shaft continues even though the clutch is disengaged. Thus to prevent such continued rotation through frictional drag within the clutch, a brake means on the adapter shaft is desirable.

However, completely stopping or restricting the rotation of the adapter shaft generates another serious difficulty. The splined nature of the adapter shaft and its receiving grooves within the farm implement require that the splines be accurately aligned with the receiving grooves before they may be inserted therein. Of course, if the braking mechanism completely stops rotation of the adapter shaft, aligning the two becomes a hit or miss proposition; requiring engaging and disengaging the clutch mechanism and its associated engagement and disengagement of the brake until the splines are aligned with the receiving grooves of the farm implement. Obviously this is a tedious and time consuming process, the elimination of which is very desirable.

SUMMARY OF THE INVENTION

Accordingly, this invention presents a braking mechanism that not only eliminates any safety hazard presented by a freely rotatable adapter shaft but also permits manual rotation of the adapter shaft through an arc sufficient to align its splines with the corresponding receiving grooves in the farm implement. The invention may take many forms, but in essence, it provides a ring member carried by and extending from the periphery of a rotatable member so as to be frictionally connected to the I.P.T.O. shaft when the clutch mechanism is disengaged. Additionally, interfering projections are disposed on a stationary member and on the braking ring. Disengaging the clutch frictionally constrains the ring member for rotation with the clutch and the interfering relation between the projecting precludes further rotation of the output shaft in one direction, but permits manual rotation in the other. Engaging the clutch releases the frictional engagement of the braking ring such that the adapter shaft may now freely rotate.

BRIEF DESCRIPTION OF THE DRAWINGS

The features of this invention will become more apparent in the following specification and drawings in which:

FIG. 4, is a cross sectional view taken along line 4—4 in FIG. 2, looking in the direction of the arrows; for purposes of clarity, some of the internal components have not been illustrated; and

DETAILED DESCRIPTION OF THE PREFERRED EMBODIMENTS

Figure 1:
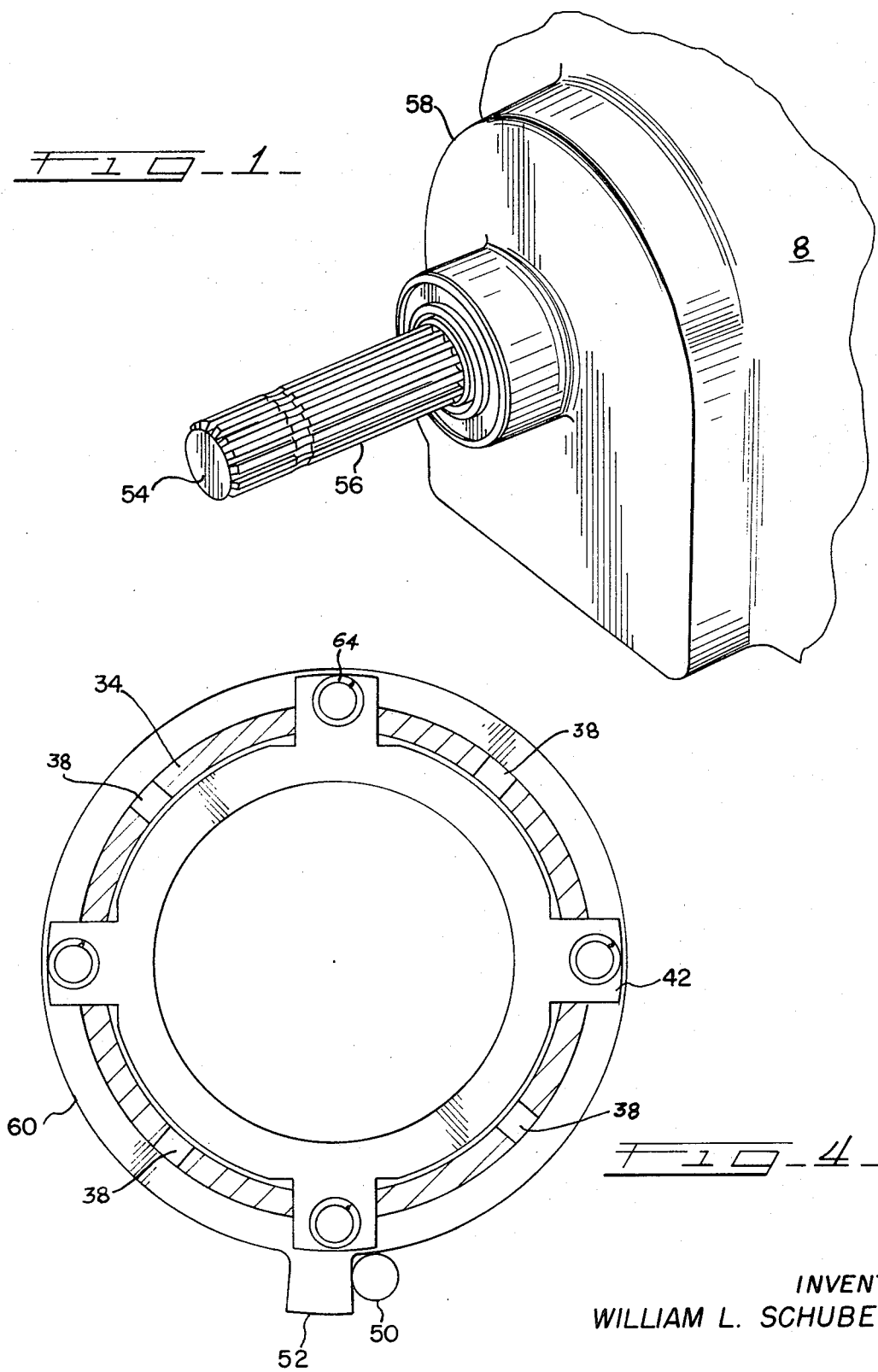
FIG. 1 is a perspective view of a splined adapter shaft carried by an I.P.T.O. unit constructed in accordance with the principles of this invention.

Referring to the drawings, wherein like reference numerals denote like parts, the I.P.T.O. unit constructed in accordance with the principles of this invention is mounted within rear frame 8 (FIG. 1) of a tractor (not shown) having an adapter shaft 54 with splines 56 extending from a boss 58 thereon. The power input components include a countershaft 10 (FIG. 2) journalled within a web section 12 of the frame 8. The countershaft 10 is rotated at a suitable speed by the tractor's engine through a conventional power transmission assembly (not shown).

A hydraulic clutch, denoted generally at 22, has been interposed between the countershaft 10 and the I.P.T.O. shaft 32 for selectively delivering power to the latter. The adapter shaft 54 (FIG. 1) having splines 56 thereon is rigidly affixed (not shown) to the I.P.T.O. shaft 32. Thus, power from the tractor's engine (not shown) may be selectively delivered through the countershaft 10, clutch 22 and the adapter shaft 54 to an associated farm implement (not shown) to operate any suitable equipment thereon.

The hydraulic clutch 22 includes friction clutch discs 28 carried by a driving drum 24 that is integral with the countershaft 10. Complementary friction clutch discs 40 are carried by conventional keys or lands (not shown) engaging slots 38 (FIG. 4) within a driven drum 34 mounted on I.P.T.O. output shaft 32 which is journaled within a counterbore 30 of the countershaft 10 and carried by appropriate bearings within frame 8. The I.P.T.O. shaft 32 is constrained for rotation with driven drum 34 by a key 36.

The clutch 22 may be engaged and thus cause power to be transmitted to I.P.T.O. shaft 32 by developing fluid pressure in annular space 18. Such fluid energy may be delivered through conventional pumps mounted on the tractor and directed through a directional flow control valve to groove 14, channel 16 to chamber 18. That hydraulic pressure acts on a piston 48 causing it and a contiguous slidable backing plate 42 to move rightwardly until the friction discs 28, 40 are compressed between backing plate 42 and abutment 44 held in place by snap ring 46 and the clutch is frictionally engaged. Biased leftwardly by springs 64 surrounding guides 62, the backing plate 42 and the piston 48 will so move upon the dissipation of that pressure by the directional flow control valve to disengage the clutch 22.

A preferred braking mechanism constructed in accordance with the principles of this invention includes a braking ring 60 that is normally free to rotate with respect to the driven drum 34. A projection 52 extends downwardly from the periphery of the braking ring 60 while a post 50 has been rigidly secured to the stationary frame 8 in interfering relationship with the rotation of the projection 52, as best seen in FIG. 4. Since the braking ring 60 is free to rotate about the driven drum 34, when the clutch is engaged, as in FIG. 2, the interfering disposition of the projection 52 and the post 50 does not affect the rotation of the driven drum 34 or the adapter shaft 54.

Figure 3:
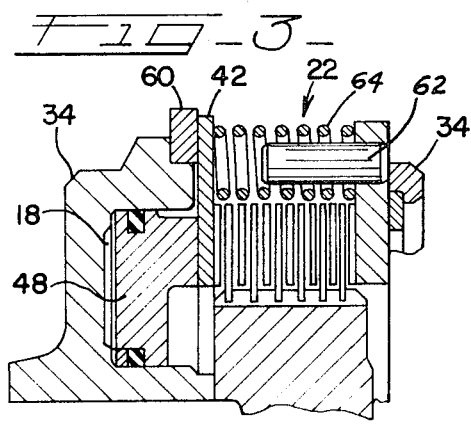
FIG. 3, is a portion of FIG. 2 depicted with the clutch disengaged.

FIG. 3 depicts the situation when the clutch 22 has been disengaged. Fluid in the annular space 18 is no longer under pressure and thus the piston 48 and the backing ring 42 have been displaced leftwardly by the action of the springs 64. Exerting their force on the backing plate 42, the springs 64 now also exert a force on the braking ring 60 and frictionally engages it between the backing plate 42 and the driven drum 34. That frictional force must be sufficient to prevent slippage of the braking ring 60 with respect to the backing ring 42 and the driven drum 34.

Accordingly when the clutch 22 is disengaged, the projection 52 abutting against the post 50 will prevent any rotation of the I.P.T.O. shaft 32 and the adapter shaft 54 due to frictional drag within the clutch 22. However, looking at FIG. 4, the braking ring 60 is free to rotate in clockwise fashion until the projection 52 abuts the post 50 on its right hand side. Consequently the adapter shaft 54 may be manually rotated through that same arc.

Figure 2:
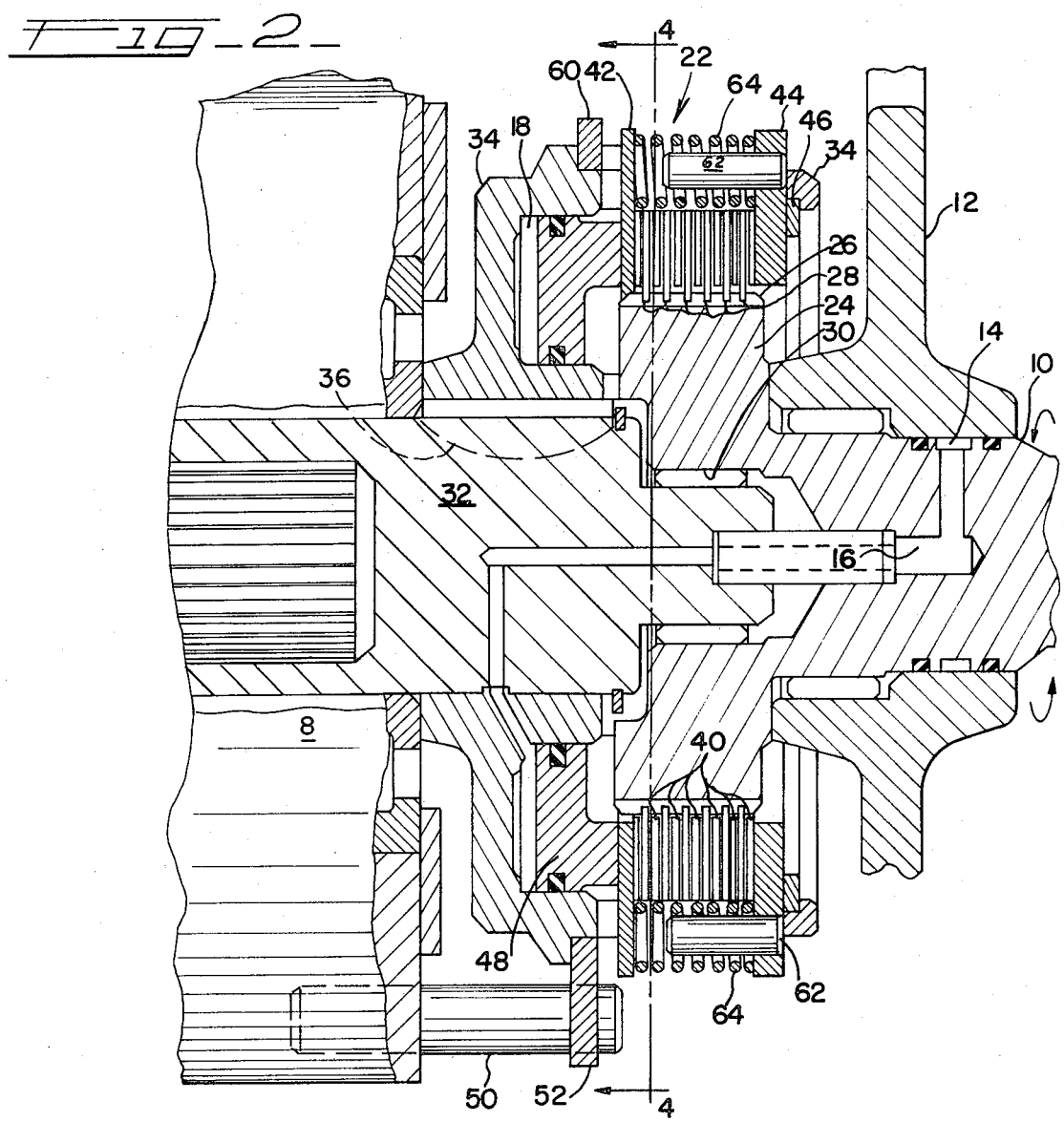
FIG. 2, partially broken away, is an axial cross-sectional view of a portion of an I.P.T.O. unit constructed in accordance with the principles of this invention, with the clutch partially engaged.

The embodiment thus far described and shown in FIGS. 2, 3, and 4, permits free rotation of the adapter shaft 54 through an arc of somewhat less than 360°, perhaps about 350°. However, the assembly only need be designed to permit free rotation through an arc equal to one-half of the greatest angular spacing between two adjacent splines on any given adapter shaft. In other words, for an adapter shaft with 6 equally spaced splines, only about 30° of free rotation need be permitted to allow alignment with the receiving grooves in the associated farm implement (not shown) from any initial relationship therebetween. For an adapter shaft having 21 equally spaced splines, the braking mechanism need allow only about 8½° of free rotation. Were a splined shaft with unequally spaced splines to be used, the braking mechanism would have to permit free rotation through an arc equal to one-half of the greatest angular separation between any two adjacent splines. Free rotations of lesser amount than that depicted, i.e., approximately 350°, could easily be effected by merely increasing the number of projections and coacting posts from one as depicted, to some greater number.

Although as depicted herein, the interfering relationship always exists with the disengagement of the clutch locking one interfering member to the output shaft. However, the frictional locking of one member is regarded as preferred as such permits some slippage so as to avoid damage to the parts upon actuation at a high I.P.T.O. speed.

Thus an improved braking mechanism has been described. Particularly useful in I.P.T.O. units utilized in farm equipment, the braking mechanism eliminates safety problems associated with an unbraked adapter shaft yet eliminates problems in aligning the adapter shaft with the receiving grooves in an associated farm implement.

Although several embodiments of the present invention have been shown and described in some detail herein, there is no intention to thereby limit the invention to the details of those embodiments. On the contrary, the intention is to cover all modifications, alternative embodiments, usages and equivalents that fall within the spirit and scope of the invention as expressed and defined in a specification and the appended claims.

What is claimed is:

1. In an I.P.I.O. assembly the combination comprising:
   an input shaft;
   an output shaft;
   clutch means for engaging and disengaging said input and output shafts;
   and frictionally connected brake means including an annular ring having at least one radial projection thereon for simultaneously restricting said output shaft from rotating through a 360° arc in either direction and permitting said output shaft to rotate through an arc greater than 0°.

2. In an I.P.T.O. assembly the combination comprising:
   a power input shaft;
   a splined output shaft;
   clutch means for engaging and disengaging said input and output shafts;
   and brake means including an annular ring having at least one radial projection thereon and being carried by said output shaft and frictionally connected thereto when said clutch is disengaged whereby restricting said output shaft from rotating through an arc greater than 360° in either direction.

3. An I.P.T.O. assembly comprising:
   an input shaft, journaled within a stationary housing, for receiving power from a vehicle;
   a splined output shaft journaled within said housing;

a clutch means for engaging and disengaging said input and output shafts;

an annular ring, comprising at least one radial projection, rotatably mounted on said output shaft;

a lug projecting from said housing and disposed in interfering relationship with said projection;

and means for holding said annular ring in fixed relationship to said output shaft when said clutch is disengaged.

4. An I.P.T.O. assembly comprising:

an input shaft, journaled within a stationary housing, for receiving power from a vehicle;

a splined output shaft journaled within said housing;

a clutch means for engaging and disengaging said input and output shafts;

said clutch means comprising an annular backing plate and carrying a relative rotatable member having a radial projection thereon, means for reciprocating said backing plate to frictionally engage and disengage said rotatable member;

a lug projecting from said housing disposed relative to said projection in an interfering relationship with reciprocation of said backing plate causing said rotatable member to rotate with said clutch means.

5. An I.P.T.O. assembly comprising:

an input shaft, journaled within a stationary housing, for receiving power from a vehicle;

a splined output shaft journaled within said housing;

clutch means for engaging and disengaging said input and output shafts;

a radial projection carried by said clutch;

means on said clutch for frictionally constraining said radial projection for rotation with said clutch;

lug means disposed on said housing; and means for placing said lug and said projection in interfering relationship upon disengagement of said clutch means.

* * * * *